US007583849B2

(12) United States Patent
Cai et al.

(10) Patent No.: US 7,583,849 B2
(45) Date of Patent: Sep. 1, 2009

(54) LOSSLESS IMAGE COMPRESSION WITH TREE CODING OF MAGNITUDE LEVELS

(75) Inventors: Hua Cai, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 11/189,235

(22) Filed: Jul. 25, 2005

(65) Prior Publication Data
US 2007/0019876 A1 Jan. 25, 2007

(51) Int. Cl.
*G06K 9/46* (2006.01)
*G06K 9/68* (2006.01)
*G06K 9/70* (2006.01)
*G06F 17/00* (2006.01)

(52) U.S. Cl. .................. 382/240; 382/244; 382/226; 382/232; 707/101

(58) Field of Classification Search ............. 382/232, 382/233, 240, 244, 226; 375/E7.047, E7.024, 375/E7.072; 707/100
See application file for complete search history.

(56) References Cited

U.S. PATENT DOCUMENTS

| 6,125,201 | A * | 9/2000 | Zador ........................ 382/166 |
| 6,269,192 | B1 * | 7/2001 | Sodagar et al. ............ 382/240 |
| 6,292,591 | B1 * | 9/2001 | Kondo ....................... 382/240 |
| 6,356,665 | B1 * | 3/2002 | Lei et al. ................... 382/240 |
| 6,373,988 | B1 * | 4/2002 | Thorell et al. ............. 382/240 |
| 6,813,335 | B2 * | 11/2004 | Shinbata ..................... 378/62 |
| 6,865,291 | B1 * | 3/2005 | Zador ........................ 382/166 |
| 6,898,324 | B2 * | 5/2005 | Pesquet-Popescu ........ 382/240 |
| 2001/0046326 | A1 * | 11/2001 | Felts et al. ................. 382/240 |
| 2002/0110280 | A1 * | 8/2002 | Prakash et al. ............ 382/240 |
| 2002/0150158 | A1 * | 10/2002 | Wu et al. ................ 375/240.12 |
| 2003/0053159 | A1 * | 3/2003 | Ito ............................. 358/518 |
| 2003/0081847 | A1 * | 5/2003 | Sato .......................... 382/240 |
| 2003/0123742 | A1 * | 7/2003 | Zhao et al. ................. 382/240 |
| 2003/0179945 | A1 * | 9/2003 | Akahori ..................... 382/260 |
| 2005/0265633 | A1 * | 12/2005 | Piacentino et al. ......... 382/302 |

OTHER PUBLICATIONS

Said et al. "A new, fast and efficient image codec based on set partitioning in hiearchical trees" Ieee tranactions on circuits and systems for video technology, v6,n3, Jun. 1996, pp. 1 to 8.*
Google Scholar Search.*
"FCD 14495, Lossless and Near Lossless Coding of Continuous Tone Still Images (JPEG-LS)", 1997, ISO/IEC 14495-1 Public Draft, 79 pages.
Todd et al, "Parameter Reduction and Context Selection for Compression of Gray-Scale Images", IBM J. Res. Develop., vol. 29, No. 2, Mar. 1985, pp. 188-193.
Wu et al, "Context-Based, Adaptive, Lossless Image Coding", IEEE Transactions on Communications, vol. 45, Issue 4, Apr. 1997, pp. 437-444.

* cited by examiner

*Primary Examiner*—Andrew W Johns
*Assistant Examiner*—Mia M Thomas
(74) *Attorney, Agent, or Firm*—Lee & Hayes, PLLC

(57) ABSTRACT

Data values, such as residual values based on a predictive value, are compressed based on a number of significant digits used to represent the data value that is termed a magnitude level. Data values are grouped, and a highest magnitude level of the magnitude levels associated with each of the data values is associated with each group. The magnitude level is expressible in fewer digits than a value of that magnitude. Further, selecting one magnitude level for each group reduces a number of magnitude levels stored, further reducing the size of the resulting file. Choosing a magnitude level associated with a group of related data values in most cases results in the highest magnitude level being close to the magnitude level for each of the data values it represents, resulting in few bits being wasted in coding the data values.

20 Claims, 12 Drawing Sheets

LOSSLESS IMAGE COMPRESSION WITH TREE CODING OF MAGNITUDE LEVELS

BACKGROUND

Digital imaging technology is continually improving. Even inexpensive digital cameras produce images with high resolution and color granularity. However, as resolution and color granularity increase, the resulting image files increase geometrically in size. Consequently, image compression has become increasingly important to reduce the storage and bandwidth used to store and transmit image data, respectively.

Generally, there are two forms of image compression: lossy compression and lossless compression. Lossy compression truncates some of the image data, thereby sacrificing some image quality, for the sake of reduced file size. By contrast, lossless image compression fully preserves the visual content of the original image, reducing the file size only by eliminating bits of data that are not used for complete reproduction of the original image.

Lossless compression is preferred when image degradation is not acceptable. For example, lossless compression is selected when the image data is to be decompressed, edited, and recompressed, when the image data was acquired at great cost, or when highest image quality is imperative. Lossless image compression typically is used for medical imaging, mass media preproduction, reproduction of fine art, professional digital photography, and similar applications.

Conventional lossless compression techniques generally employ two phases. The first phase is a modeling phase, in which the image data is analyzed to develop a probabilistic model, determining the frequency with which certain values appear in the image data. For example, in a grayscale image of a landscape, there may be numerous elements with grayscale values that represent common shades of the grass and common shades of the sky, while there may be comparatively fewer elements with grayscale values that represent the shades of tree trunks and other less common features. The frequencies with which different grayscale values appear are analyzed and ranked.

The second phase is a coding phase that reduces the size of the image data based on the probabilities determined in the modeling phase. Entropy coding is commonly used to encode and compress the image. Analyzing the frequency with which various values are represented, entropy coding replaces the standard binary values of the more frequently occurring values with shortened series of bits, while assigning longer series of bits to those values occurring less frequently. Replacing the more frequently occurring values with shortened series of bits reduces the size of the resulting compressed image file. Thus, the content of the file is recoded in fewer bits, but without truncating any of the image data.

A two-phased modeling/coding approach can significantly reduce the size of the file and thereby achieve high coding efficiency. On the other hand, the modeling phase and encoding phase both consume extensive processing resources. Analysis of the statistical characteristics of the original image performed in the modeling phase alone is highly computationally intensive. Furthermore, depending on the entropy coding algorithm used, the coding phase also may involve extensive processing. Thus, while conventional lossless compression techniques may achieve high coding efficiency, the high coding efficiency is gained at the cost of processing time and resources.

SUMMARY

Data values, such as residual values based on a predictive value, are compressed based on a number of digits used to represent the data value. The number of bits used to represent the data value is termed a magnitude level. Data values are grouped, and a highest magnitude level of the magnitude levels among the data values in the group is associated with the group. Because the magnitude level is expressible in fewer digits than would be used to express the original value, a group of magnitude levels uses fewer bits to store. Further, selecting one magnitude level for each group reduces a number of magnitude levels to be stored with the compressed data, further reducing the size of the resulting file. Choosing a magnitude level associated with a group of related data values in most cases results in the highest magnitude level generally being close to the magnitude level for each of the data values it represents. Thus, even using a single, highest magnitude level for a group of data values results in few superfluous bits used in coding the data values.

The data values are coded based on the number of least significant bits equal to the applicable magnitude level. The number of least significant bits equal to the magnitude level may be stored directly, in an uncoded binary form, thereby saving processing overhead in encoding and decoding the data values. Alternatively, arithmetic coding or other coding methods may be used to achieve greater coding efficiency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a three-digit reference number identifies the figure in which the reference number first appears, while the two left-most digits of a four-digit reference number identifies the figure in which the reference number first appears. The use of the same reference numbers in different figures indicates similar or identical items.

DETAILED DESCRIPTION

Data files, such as image files, can be losslessly compressed by coding data values based on a number of least significant bits used to express non-null data values. For example, a series of elements within a data file may be represented by a series of eight-bit representations. By identifying a predictive value for the representations, each of the representations can be reduced to a smaller value relative to the predictive value that is expressible in a fewer number of bits. Thus, for example, eight-bit representations may be reexpressed as a residual value expressible in only a few bits.

The number of least significant bits expressing non-null values for these elements is identified as a magnitude level for these elements. Coding each of these elements using a number of least significant bits equal to the magnitude level for each element or an appropriate magnitude level for a group of elements, fewer bits are used in coding the elements. A number of bits used to code the corresponding magnitude levels uses less storage space than the number of bits used to store the data file in an uncompressed form. Further, in one exemplary mode of coding described further below, the number of bits used in coding the elements is reduced without performing probabilistic coding, thereby saving processing overhead in both coding and decoding files in addition to saving storage space or bandwidth in reducing the size of the data files.

Magnitude Level Encoding and Decoding

Figure 1:
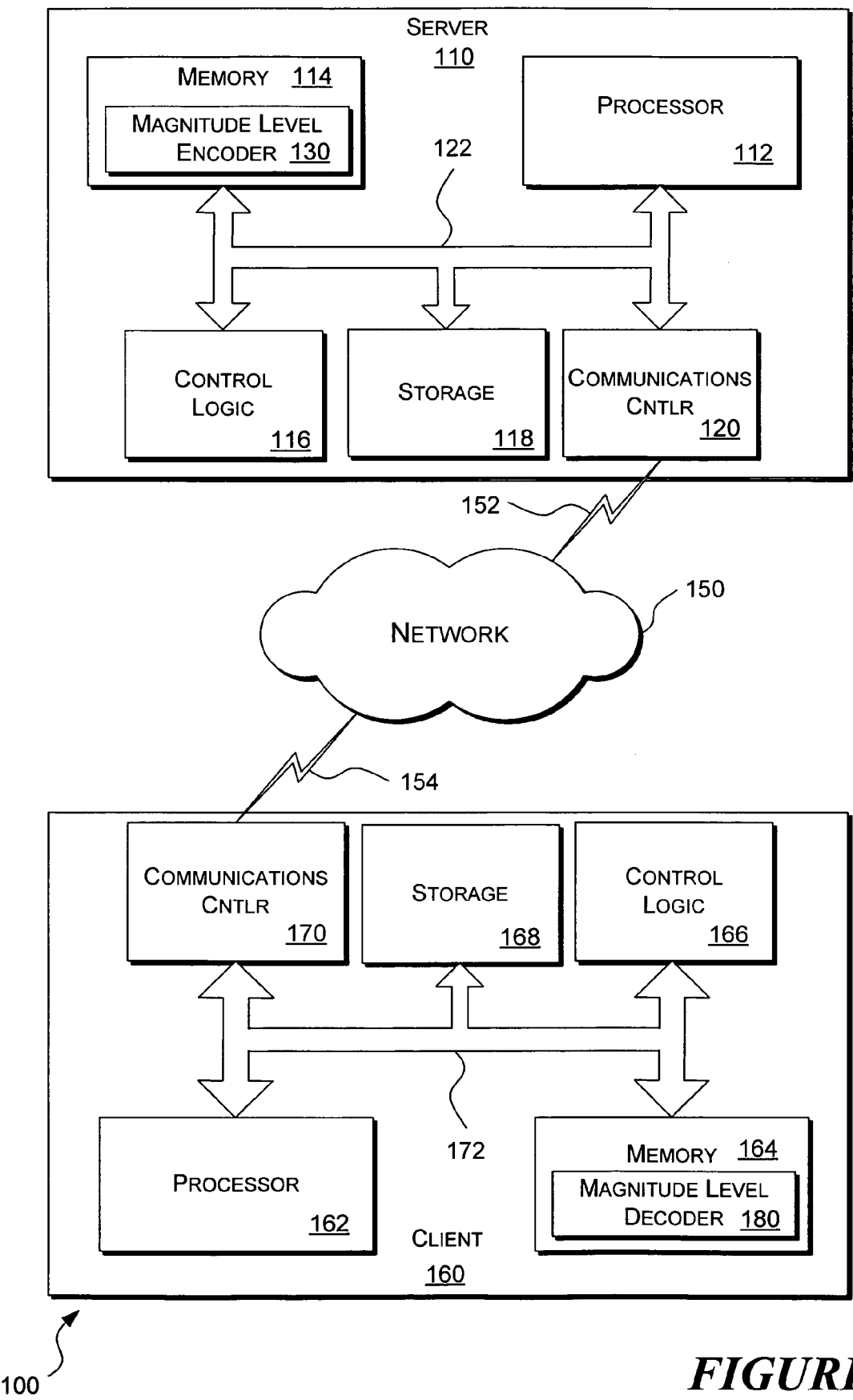
FIG. 1 is a block diagram of a server configured to perform magnitude level encoding on a codestream and a client configured to receive and decode the encoded codestream.

FIG. 1 represents a system 100 in which data files, such as image files, are compressed by a server 110 and decoded by a client 160 to reduce data storage and bandwidth used in storing and transmitting the data file, respectively. In the example of FIG. 1, the server 110 communicates with a network 150, such as the Internet, by a communications medium 152, and the client 110 communicates with the network 150 using a communications medium 154.

More specifically, the server 110 includes a processor 112, memory 114, control logic 116, storage 118, and a communications controller 120. Data is exchanged between subsystems of the server 110 via system bus 122. In the embodiment shown in FIG. 1, magnitude level coding is implemented in software, and includes a number of instructions executable on the processor 112 and stored in memory 114 as a magnitude level encoder 130. Alternatively, magnitude level coding is implementable in hardware included within the control logic 116.

Uncompressed data files are received via communications controller 120 and/or are stored in storage 118. In the embodiment shown, data files to be compressed are retrieved from storage 118 into memory 114, where the processor 112 executes magnitude level encoder 130 instructions to compress the data file. The compressed data file is stored in storage 118.

To access the data, the client 160 sends a data file request to the server 110 which the server 110 receives via the communications medium 152. Responding to the request, the processor 112 directs that the compressed data file be transmitted via the communications controller 120 over the communications medium 152 to the network 150. In turn, client receives the compressed data file from the network 150 via the communications medium 154.

The client 160, comparable to the server 110, includes a processor 162, memory 164, control logic 166, storage 168, and a communications controller 170, all of which are linked by a system bus 172. When the compressed data file is received by the communications controller 170, the compressed data file is stored in storage 168. As in the case of the server 110, although magnitude level decoding may be implemented in hardware within control logic 166, in one embodiment, the magnitude level decoder 180 is implemented in programming instructions stored in memory 164 and executed by the processor 162. When a user directs the client 160 to access the compressed data file, the compressed data file is retrieved from storage 168 and loaded in memory 164 where the content is decompressed for display (not shown).

In the embodiment shown in FIG. 1, the server 110 compresses data files and the client 160 decompresses data files. However, it will be appreciated that the client 160 also may be configured to perform data compression and the server 110 may correspondingly configured to perform decoding and decompression of the data.

Embodiment of a Magnitude Level Encoder

Figure 2:
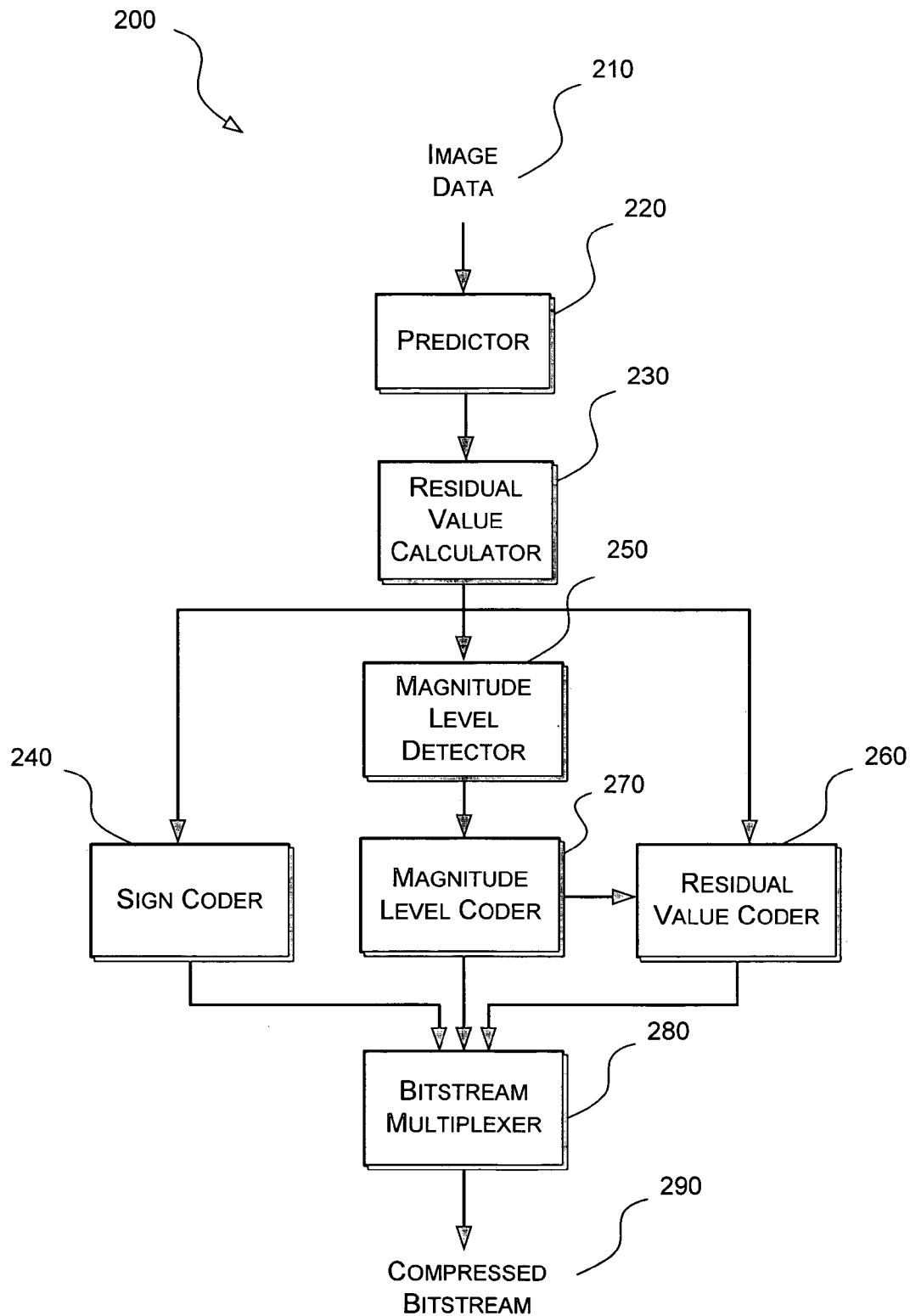
FIG. 2 is a block diagram of an embodiment of an encoder used in lossless compression.

FIG. 2 is a functional block diagram of a system 200 operable to perform magnitude level encoding. As previously described in connection with FIG. 1, a system 200 for magnitude level encoding is implementable as software that can be retrieved into system memory and executed by a processor, or may be performed by a hardware device configured to perform functionally comparable operations.

In the example of FIG. 2, the system 200 receives uncompressed data in the form of image data 210. The image data 210 may include luminosity values for a grayscale image, or a luminous or chrominous component of a color image. Alternatively, the image data 210 may include frequency domain data transformed from spatial domain data into a frequency domain, if desired. Thus, embodiments of a magnitude level encoder are adaptable to encode different forms of the image data 210. It should be noted that, although magnitude level coding is well suited for use with image data, magnitude level coding is useable to compress other types of data files.

A predictor 220 receives the image data 210. The predictor 220 identifies an appropriate predictive value for each of a plurality of data elements within the image data 210 based on values of one or more related data elements within the image data 210. Using predictive values generated by the predictor 220, a residual value calculator 230 generates a representative value for each data element, where the residual value represents a difference between the data value and the predictive value. If the predictive value is reasonably accurate, the magnitude of the residual value generated by the residual value calculator 230 is appreciably less than the original value it replaces, allowing the value of the data element to be expressed in fewer bits. Operation of both the predictor 220 and the residual value calculator 230 are explained in greater detail below with regard to FIGS. 4 through 7.

A sign coder 240 receives the output of the residual value calculator 230, and, for any nonzero residual values, encodes a representation of whether the residual value is greater or less than the predictive value generated by the predictor 230. The magnitude level detector 250 also receives the output of the residual value calculator 230 and determines a number of bits used to represent the residual value. For example, if the residual value has a magnitude of 5, a three-bit binary number is used to represent that residual value. The magnitude level coder 270 receives the output of the magnitude level detector 250 and identifies an appropriate magnitude level to be used in encoding residual values of a plurality of data elements. In one exemplary embodiment described further below, the magnitude level coder 270 selects a highest magnitude level for residual values for each of a related group of data elements.

The value coder 260 receives the output of the residual value calculator 230 and the magnitude level coder 270. As is described both previously and in greater detail below, the magnitude level selected for each data element or group of data elements reflects a number of non-null least significant bits that can be used to represent the residual values and, therefore, replace the original values of the data elements with fewer bits. In other words, a number of null, most significant bits in excess of the magnitude level is truncated to reduce the size of the representation for each data element. The residual value coder 260 may store truncated, uncoded representations of the residual values, or a coding system may be used further to compress the remaining values, as is described below. A key value or starting value may be included in the compressed datastream 290 to facilitate regeneration of the original values from the residual values in subsequent decoding.

Output of the sign coder 240, the magnitude level coder 270, and the residual value coder 260 all are passed to the bitstream multiplexer 280, which generates the compressed bitstream 290, which is the output of system 200. As previously described with regard to FIG. 1, the compressed bitstream 290 is stored, for example, in storage 118 (FIG. 1) of the server 110, saving storage space as compared to saving the image data 210. Alternatively, the compressed bitstream 290 may be transmitted over the network 150, using less bandwidth than would be used in transmitting the uncompressed image data 210.

Embodiment of a Magnitude Level Decoder

Figure 3:
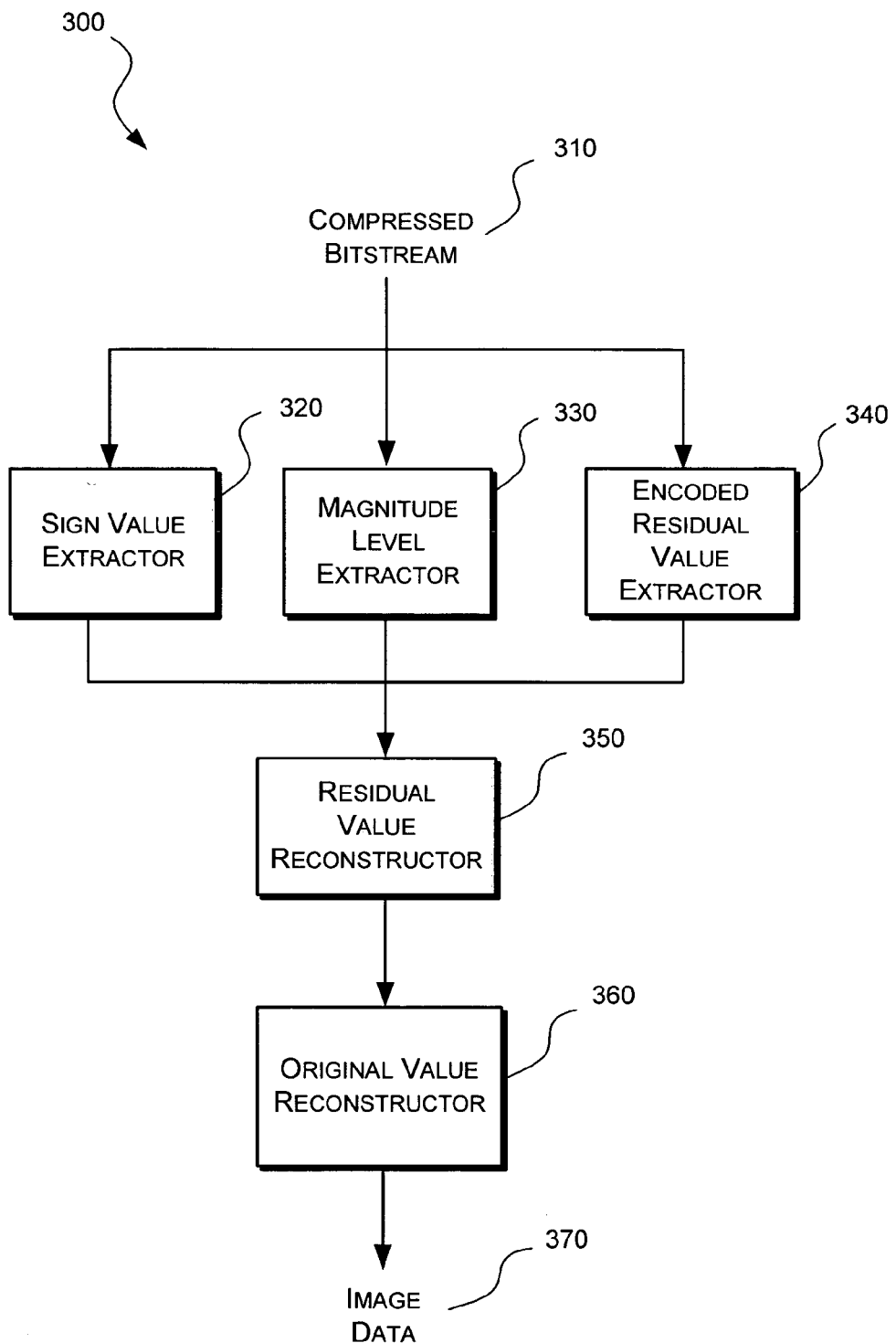
FIG. 3 is a block diagram of an embodiment of a decoder used to decode the compressed codestream generated by the encoder of FIG. 2.

FIG. 3 is a functional block diagram of a system 300 operable to decode data compressed by a magnitude level encoder as described with regard to FIG. 2. The compressed bitstream 310 is retrieved from storage or received via a network as previously described. The magnitude level extractor 320 receives the compressed bitstream 310 and identifies the magnitude levels specifying how many bits of the residual values were used in encoding the residual values. The encoded residual value extractor 340 extracts the coded forms of the residual values from the compressed bitstream 310.

The residual value reconstructor 350 receives the output of the sign value extractor 320, the magnitude level extractor 330, and the encoded residual value extractor 340. Using the extracted sign value, magnitude level, and encoded residual value, the residual value reconstructor 350 derives the residual value for each of the data elements. The original value reconstructor 360 receives the residual values from the residual value reconstructor 350 and, as appropriate, a starter value or key value included within the compressed bitstream 310. The original value reconstructor 360 determines the predictive values that were used to generate the residual value for each element and, using the combination of the residual values and the predictive values on which they were based, recreates the original values. The original value reconstructor 360 thus produces the image data 370, which is the same image data 210 (FIG. 2) that the compression system 200 received and compressed into the compressed bitstream 310. The image data 370 can be displayed on a display device, stored for later retrieval, or other purposes.

Processes used in the generation of predictive and residual values, detection and coding of magnitude level, and residual value coding are described in more detail with regard to FIGS. 4 through 11.

Generating Predictive Values and Residual Values

Figure 4:
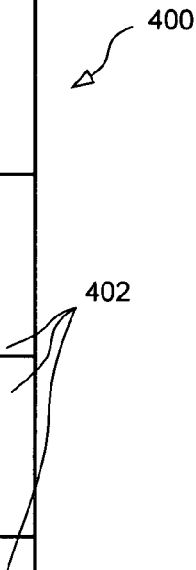
FIG. 4 is an array of coefficients from a portion of an image.

FIG. 4, for sake of illustration, is an array 400 of data values representing data values in portion of a data file such as image data 210 (FIG. 2). More specifically, FIG. 4 is a four-by-four array 400 of coefficients $c_1$ through $c_{16}$ representing eight-bit grayscale values associated with respective elements 402 in a small section of an image file. As is the case with most small sections of an image, the coefficients vary by a relatively small amount. The variation from element 404, having the lowest coefficient $c_1$ 122, to element 406, having the highest coefficient $c_{16}$ 136, is only 14.

To reduce the number of bits used to express the image data depicted in FIG. 4, the predictor 220 (FIG. 2) evaluates the coefficients of one or more elements 402 in the array 400 to determine an appropriate predictive value for one or more other elements 402 in the array 400. For example, one method of determining a predictive value includes averaging coefficients for a selected portion of the array and rounding down to the nearest integer value. The average of coefficients $c_1$-$c_{16}$ is 127.0625, thus, by this first technique, an appropriate predictive value is 127.

Figure 5:
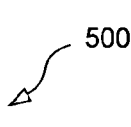
FIG. 5 is an array of residual values replacing the coefficients of FIG. 4 with residual values relative to a predictive value.

FIG. 5 shows a residual value array 500 in which the residual values $rv_1$-$rv_{16}$ replace the coefficients in array 400 (FIG. 4). More specifically, the residual values $rv$-$rv_{16}$ represent an offset of the coefficients $c_1$-$c_{16}$ relative to the predictive value of 127. Thus, for example, for element 404 in array 400, coefficient $c_1$ 122 is replaced with residual value $rv_1$ −5 of element 504 in array 500. Similarly, for element 406 in array 400, coefficient $C_{16}$ 136 is replaced with residual value $rv_{16}$ +9 of element 506 in array 500.

Figures 6, 7:
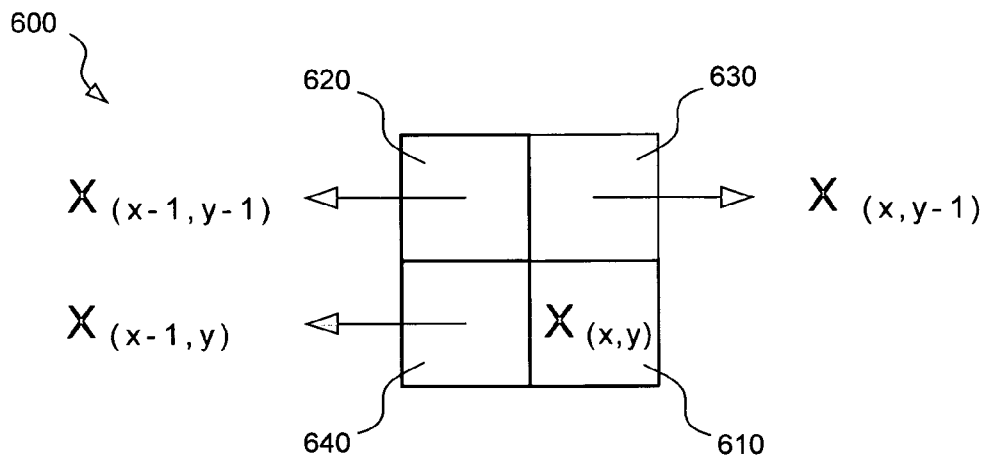
FIG. 6 is a two-by-two array representing a portion of an image illustrating neighboring elements used in a mode of predicting values of a selected element.
FIG. 7 is an array of residual values and magnitude levels derived from the array of coefficients of FIG. 4 using one mode of a predictive method described in connection with FIG. 6.

FIG. 6 shows another mode of creating predictive values and calculating residual values. More specifically, in the modes illustrated by FIG. 6, predictive values are generated for each element based on a sample of one or more adjacent elements.

FIG. 6 shows a two-by-two array 600 of elements from which a predictive value is derivable several different ways. $X_{(x,y)}$ 610 represents an element for which a predictive value and a residual value are to be determined. The array 600 also includes element $X_{(x-1,y-1)}$ 620, which precedes element $X_{(x,y)}$ 610 by one row and one column. Element $X_{(x,y-1)}$ 630 precedes element $X_{(x,y)}$ 610 by one row in the same column. Element $X_{(x-1,y)}$ 640 precedes $X_{(x,y)}$ 610 by one column in the same row. In one exemplary process, a residual value $C_{(x,y)}$ of element 610 is determinable from array 600 using one of four modes:

$$rv_{(x,y)} = c_{(x,y)} - c_{(x-1,y)} \qquad \text{mode 1}$$

$$rv_{(x,y)} = c_{(x,y)} - c_{(x,y-1)} \qquad \text{mode 2}$$

$$rv_{(x,y)} = c_{(x,y)} - c_{(x-1,y-1)} \qquad \text{mode 3}$$

$$rv_{(x,y)} = c_{(x,y)} - 0.5(c_{(x-1,y)} + c_{(x,y-1)}) \qquad \text{mode 4}$$

Thus, in mode 1, residual value $rv_{(x,y)}$ for element 610 is calculated based on the coefficient $c_{(x-1,y)}$ of element 640. In mode 2, residual value $rv_{(x,y)}$ of element 610 is calculated based the coefficient $c_{(x,y-1)}$ of element 630. Alternatively, in mode 3, residual value $rv_{(x,y)}$ of element 610 is calculated based the coefficient $c_{(x,y-1)}$ of element 620. Finally, in mode 4, residual value $rv_{(x,y)}$ of element 610 is calculated based on an average of the coefficient $c_{(x-1,y)}$ of element 640 and coefficient $c_{(x,y-1)}$ of element 620. With four modes in this exemplary technique, the chosen mode can be encoded by a two-bit value stored with the compressed image data.

Using one or more of the neighboring elements is well suited for modes of magnitude level encoding because the variation in coefficients between neighboring elements generally will be small. Because coefficients of most elements are likely to be equivalent or nearly equivalent to neighboring elements, magnitude levels of resulting residual values are likely to be the same or similar.

FIG. 7 shows an array 700 of residual values derived from coefficients of array 400 (FIG. 4 using mode 2 described in connection with FIG. 6. Mode 2 generates a residual value using the coefficient of the element in the preceding column of the same row as a predictive value. For the sake of this illustration, an assumed column of coefficients 702 for elements (not shown) preceding a first column 704 of the array 700 are included.

Using mode 2, for example, residual value $rv_1$ of element 706 is +1, because the coefficient of element 402 (FIG. 4) is 122, which is one more than coefficient 408 of the element in the preceding column 402 in the same row. Using the same method, the residual values $rv_1$-$rv_{16}$ of the array 700 are small values of +1 or +2, except for the rather anomalous value +5 or $rv_{15}$ of element 710.

In addition to showing residual values $rv_1$-$rv_{16}$ for each element, the array 700 also shows a magnitude level of each residual value. The magnitude level is the number of least significant bits used to represent the residual value of each element. The magnitude level does not include the sign value of the residual value, which is encodable as a one-bit value, for example, identifying a positive residual value with a 0 and a negative number with a 1. Thus, the magnitude level of residual value of +1 for $rv_1$, for element 706 is 1, because one bit is used to represent the number 1. The magnitude level for element 712 is 2 because two binary bits are used to represent the decimal number 2 (i.e., decimal numeral "2" is equivalent to binary number "10"). The magnitude level for element 712 is 3 because three binary bits are used to represent the number 5 (i.e., decimal numeral "5" is equivalent to binary number "100").

Magnitude Level Coding

Magnitude levels determined as described in connection with FIG. 7 may be encoded in the resulting output file in a number of ways. One mode of magnitude level coding is magnitude level tree encoding which is illustrated in FIG. 8.

Figure 8:
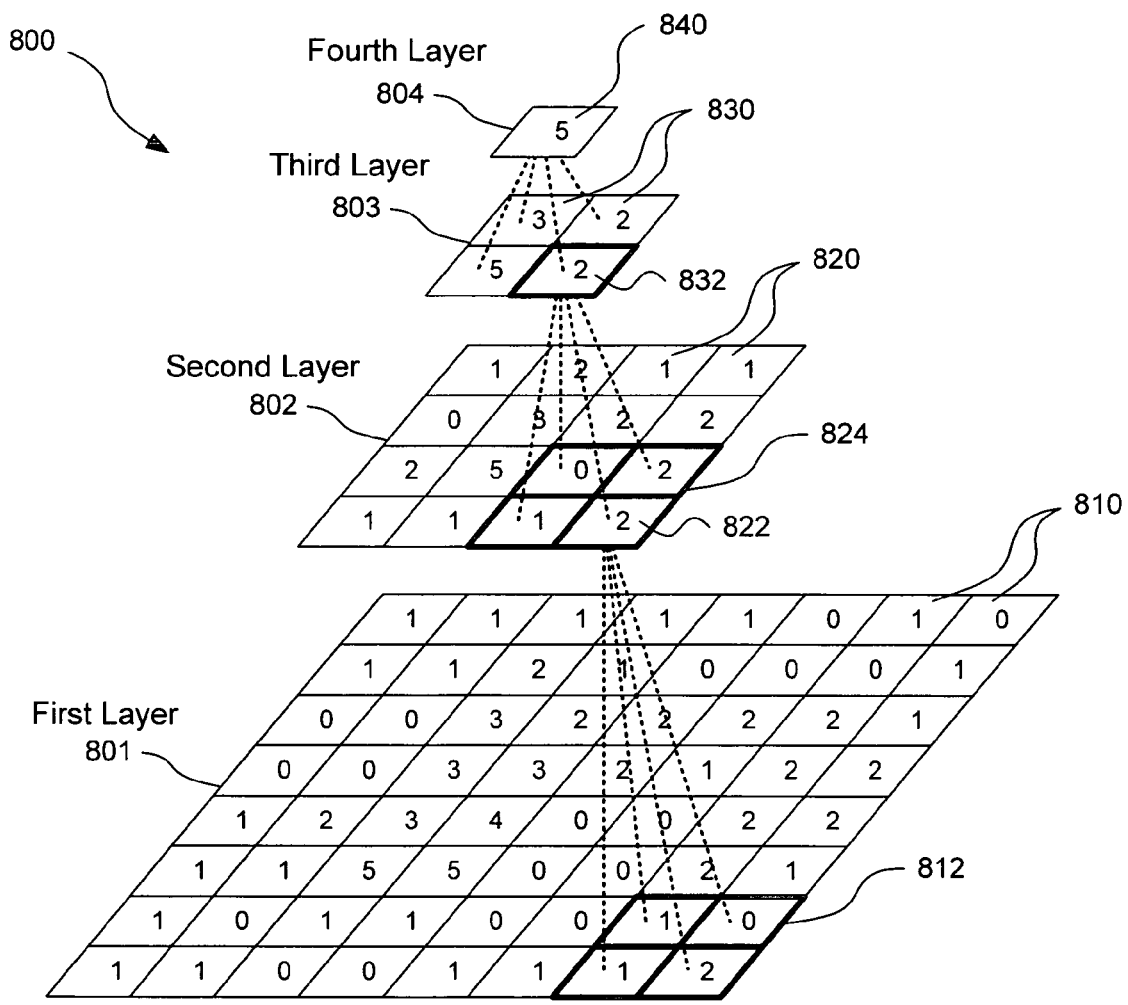
FIG. 8 is a magnitude level tree used for coding magnitude levels.

FIG. 8 shows a magnitude level tree 800 consisting of four layers 801 through 804. The first layer 801 is populated with magnitude levels 810 determined as previously described in connection with FIG. 7. As in the example of FIG. 7, each of the magnitude levels 810 in the first layer 801 represents the magnitude level of a coefficient of a single image element.

In each successive layer in the magnitude level tree 800, a number of magnitude levels is reduced by a factor of two in each dimension, thereby reducing the number of magnitude levels to be stored by a factor of four. In other words, the first layer 801 includes an eight-by-eight array of magnitude levels 810, for a total of 64 magnitude levels 810. The second layer 802 includes one-fourth the number of magnitude levels of the first layer 801. The second layer 802 includes a four-by-four array of magnitude levels 820, for a total of 16 magnitude levels. The third layer 803 includes a two-by-two array of magnitude levels 830. The fourth layer 804 includes only a single magnitude level 840. The first layer 801 of magnitude level tree 800 represents only a portion of an image, but it will be appreciated that dimensions of the first layer 801 and the succeeding layers 802-804 are scalable to accommodate images having any number of elements.

In one embodiment of the magnitude level tree 800, magnitude levels express a highest magnitude level of the four elements it replaces. Thus, a four-by-four element section 812 of the first layer 801 is replaced by a single element 822 in the second layer 802. In one embodiment of a magnitude level tree 800, the magnitude level assigned to element 822 represents the highest magnitude level in the four-by-four element section 812 of the first layer 810. Similarly, a four-by-four element section 822 of the second layer 802 is replaced by a single element 832 in the third layer 803. Again, the magnitude level assigned to element 832 represents the highest magnitude level in the four-by-four element section 824 of the second layer.

Expressed mathematically, each of the coefficients $T^1_{(x,y)}$ on the first layer 801 equals the corresponding magnitude level $L_{(x,y)}$ of that element. For other coefficients in an $i^{th}$ depth (i>1) magnitude levels are derived from their child coefficients according to the relationship expressed in Eq. 1:

$$T_{(x,y)}^i = \max\{T_{(2x,2y)}^{i-1}, T_{(2x,2y+1)}^{i-1}, T_{(2x+1,2y)}^{i-1}, T_{(2x+1,2y+1)}^{i-1}\} \quad (1)$$

Not all layers of the magnitude level tree are always or used in encoding and decoding the image data. For example, and as is explained further below, the magnitude level tree 800 may be truncated at a second or third layer once the magnitude levels to be stored in the elements of those layers have been derived from the lower layers. Because the magnitude levels stored in higher layers are at least as large as the magnitude levels in elements of the lower layers, truncating layers of the tree construction will not result in truncation of the residual values of any of the elements as is further described below.

Figure 9:
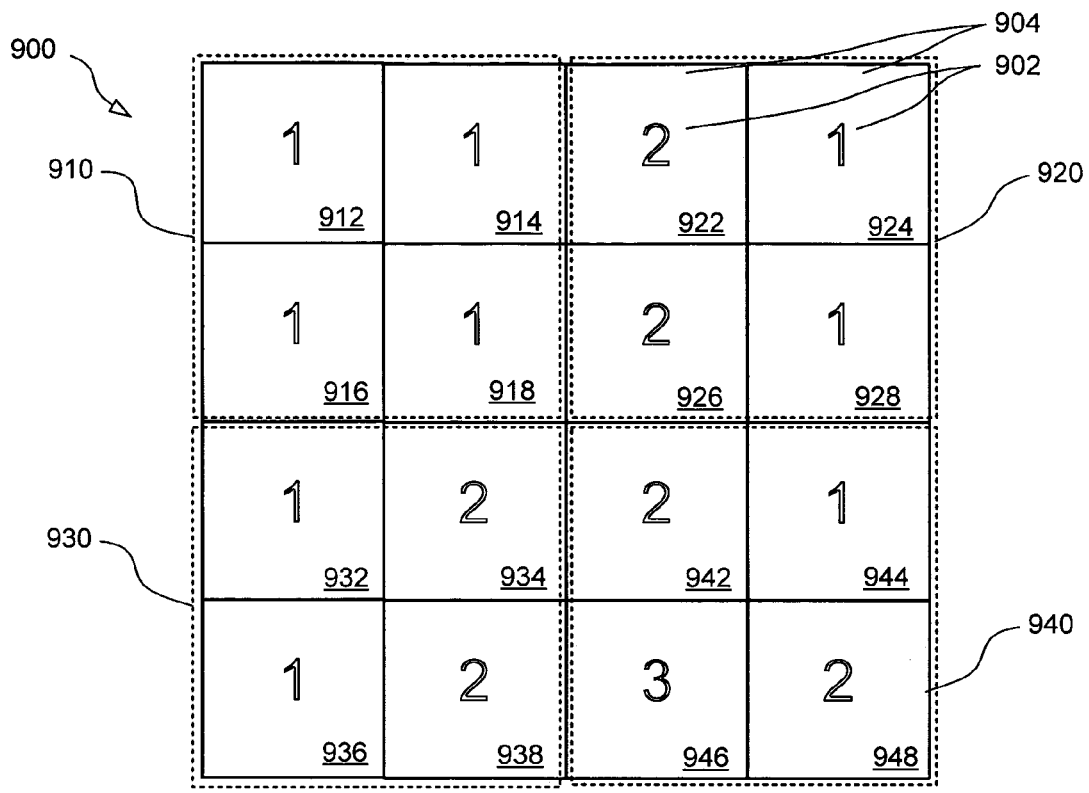
FIGS. 9, 10 and 11 represent sections of a magnitude level tree derived from the array of residual values and magnitude levels of FIG. 7.
Figure 10:
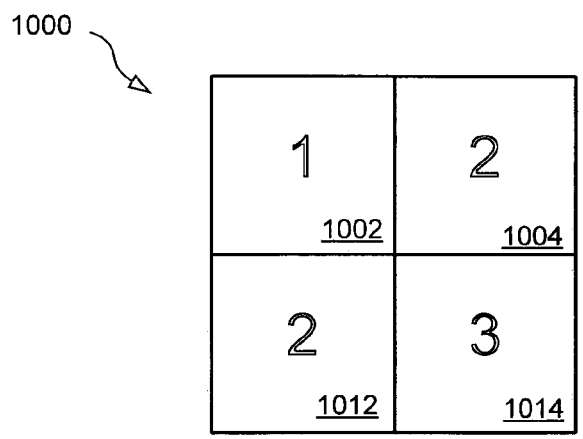
Figure 11:
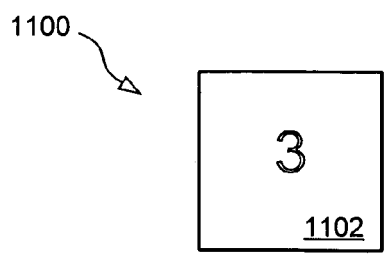

For further example, FIGS. 9-11 show a portion of a magnitude level tree derived from coefficients in the array 400 reduced to residual values as described in connection with FIGS. 6 and 7. More specifically, FIG. 9 shows an array 900 of magnitude levels 902 for a number of elements 904. The magnitude levels 902 correspond to the magnitude levels in the residual value array 700.

To create the next layer of a magnitude level tree, magnitude levels 902 are collected in groups or sub-arrays. More specifically, group 910 includes residual values 912, 914, 916, and 918. Group 920 includes residual values 922, 924, 926, and 928. Group 930 includes residual values 932, 934, 936, and 938. Finally, group 940 includes residual values 942, 944, 946, and 948.

FIG. 10 shows, similar to the manner illustrated in FIG. 8 in which the magnitude levels for four-by-four group of elements 812 were replaced with a single magnitude level 822, the highest magnitude levels of each of groups 910, 920, 930, and 940 (FIG. 9) collected as the elements in a next layer of magnitude level tree 1000. A highest magnitude level in group 910 is 1, which is then stored as element 1002 in a second layer 1000 of the magnitude level tree. Because each of magnitude levels 912-918 is 1, the magnitude level 1 stored in element 1002 of layer 1000 is perfectly representative of magnitude levels 912-918, resulting in a high coding efficiency as will be further described below.

A highest magnitude level in group 920 is 2, which is then stored as element 1004 in second layer 1000 of the magnitude level tree. A highest magnitude level in group 930 also is 2, which is then stored as element 1012 in second layer 1000 of the magnitude level tree. In each of groups 920 and 930, a magnitude levels of 2 written as elements in 1004 and 1012 are equal to the magnitude levels of half of the elements they represent, and only one more than the other magnitude levels. This also will result in a good coding efficiency.

Finally, a highest magnitude level in group 940 is 3, which is then stored as element 1014 in a second layer 1000 of the magnitude level tree. Only for group 940, where the highest magnitude level of 3 is stored in element 1014, results in a magnitude level that is more than one greater more than those of the residual values it represents.

FIG. 11 represents a third layer 1100 of the magnitude level tree, where one value in element 1102 represents a highest of the magnitude levels in the second layer 1000 of the magnitude level tree. Magnitude level 3 stored in element 1102 results in 1 to 2 unnecessary bits being written for each of the elements 604 (FIG. 9). Using a third layer of the magnitude level tree potentially results in some loss of coding efficiency relative to the residual values. However, the loss of coding efficiency may be compensated for by the fact that only one magnitude level will be encoded in the compressed data stream instead of sixteen magnitude levels that would be encoded for the first layer 900 or four magnitude levels that would be encoded for the second magnitude layer 1000. Moreover, using a coding method that shortens the bit representations of the residual values as described below, the savings gained by reducing the number of magnitude levels may be worth coding residual values based on one or a few extra bits.

Tree construction is only one suitable form of coding magnitude levels. Other forms of magnitude level coding may be used. To name one exemplary alternative, the magnitude levels may be encoded in a flat file including entries that each include a first value representing the magnitude level and a second value representing a number of elements for which the magnitude level is applicable and, thus, repeats. Other forms of magnitude level coding are suitable for use with magnitude level compression.

Lossless Compression Using Magnitude Level Coding

Figure 12:
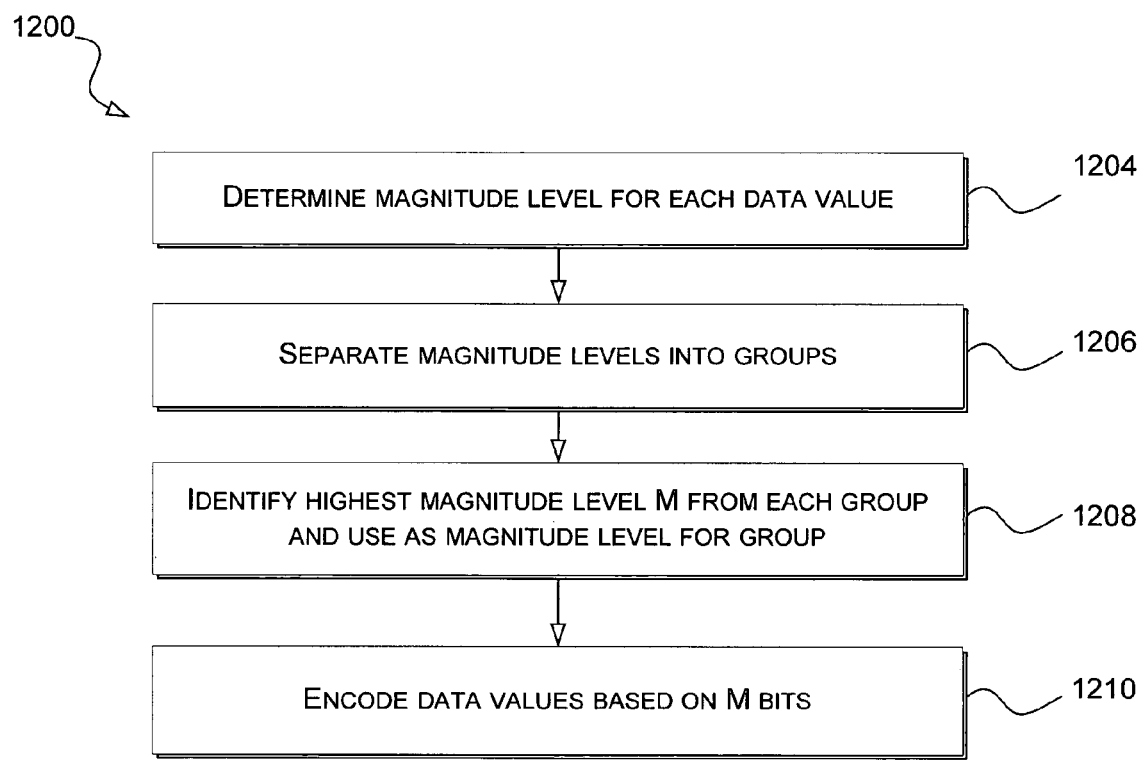
FIGS. 12 and 13 are flow diagrams illustrating processes for performing lossless image compression using magnitude levels.

FIG. 12 shows a general process 1200 for one mode of magnitude level coding. At block 1204, a magnitude level of the residual value is determined. The magnitude level represents the number of bits used to express the residual value. As is known in the art, in digital systems, identifying a number of bits used in representing a value is a fast and simple operation performable by a native instruction on a microprocessor.

At block 1206, the magnitude levels are separated into groups. At block 1208, the highest magnitude level within each group is identified, and the magnitude level is used as the magnitude level for the group. At block 1210, the data values are encoded using a number of bits of each data value equal to the group magnitude level for each group.

Figure 13:
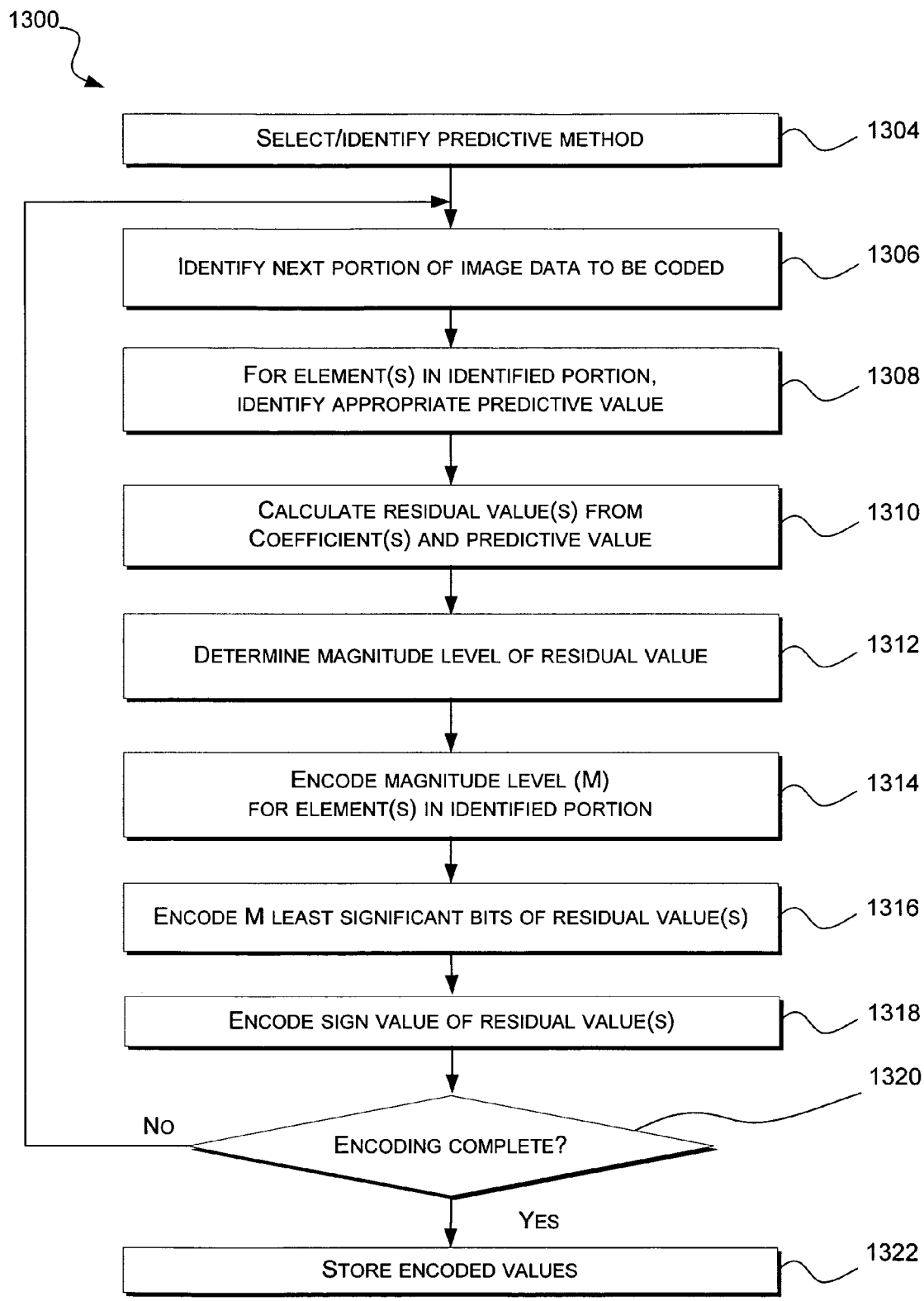

FIG. 13 shows in more detail a process 1300 for magnitude level coding. At block 1304, a predictive method used for identifying predictive values and resulting residual values is selected and identified to facilitate later decoding. A mode of determining predictive values as described in connection with FIGS. 4-7 may be used for determining predictive values and residual values, or another suitable method may be selected. As described in connection with FIG. 6, the method of determining predictive and residual values is identified with the compressed image file for use in later decompression of the image file.

At block 1306, the next portion of the image data to be coded is identified. For example, using modes 1-4 described above in connection with FIG. 6, each element is coded one at a time based on an array of one of more neighboring elements. At block 1308, for the element or elements identified, an appropriate predictive value is identified. Thus, again using modes 1-4 as an example, the predictive value will include the coefficient of a selected neighboring element, or an average of more than one of the neighboring elements. At block 1310, using the predictive value, the residual value for the element (or elements) being coded is calculated. Again, with regard to modes 1-4, the residual value is based on one or more of the neighboring elements.

At block 1312, the magnitude level of the residual value is determined. Again, the magnitude level represents the number of bits used to express the residual value. As is known in the art, in digital systems, identifying a number of bits used in representing a value is a fast and simple operation performable by a native instruction on a microprocessor.

At block 1314, the magnitude level of the residual value is encoded. Magnitude levels may be encoded in a number of ways, as previously described. According to one mode of magnitude level coding, magnitude levels are encoded in a tree structure, as described in connection with FIGS. 9 through 11, and is further described with regard to FIG. 13. Using a tree structure, the tree may be truncated at different levels depending on the process selected for coding residual value, as also is further described below.

Once magnitude levels associated with one or more elements are encoded at block 1314, at block 1316, the residual value for the element is encoded. Magnitude level coding is suitable for use with a number of different modes of coding residual values. Use of a binary uncoded mode and an arithmetic-coded mode are two of the possible methods for coding residual values.

Using a binary uncoded mode of magnitude level coding, for the associated magnitude level M encoded at block 1314, M least significant bits of the residual value are stored. Any bits beyond the magnitude level will be zero, and thus can be truncated. Because the sign value is separately encoded, only a magnitude of the residual value is coded. In this mode, no entropy encoding is applied on the resulting bits, saving processing overhead in both encoding and decoding the image. Compression is achieved without entropy encoding by the truncation of unnecessary most significant bits in encoding the residual values.

Alternatively, the residual value may be encoded using arithmetic coding, a known method of coding and compressing binary values. In contrast to the binary-uncoded mode, arithmetic coding involves greater processing overhead, but yields a more compressed image stream.

Using context-based arithmetic coding reduces the number of bits to be written to improve the coding efficiency. In encoding the residual value, the number of less significant bits of the residual value initially is represented by a bit plane representation. Each of the bit-plane representations is modeled by a context template. The context template includes the level of the current bit-plane, the significance in the current bit plane of the residual values of the element in the previous column of the same row and the element in the previous row of the same column, and the significance in the previous bit plane of the residual value of the current element. The found context and the binary value of the residual value in the current bit plane are submitted to a QM coding engine to generate the arithmetically coded representation.

Processing the bit plane representations to develop the context template and operation of the QM engine increases processing overhead in encoding the image as compared with using the binary uncoded mode. Similarly, processing overhead is increased in decoding the same image. However, with the reduction in bits used in storing one-fourth the number of magnitude levels, and the compression achieved by using context-based arithmetic coding, greater compression is achieved. Thus, magnitude level coding is adaptable to optimize processing overhead or resulting image size in lossless compression.

At block 1318, a sign value of the residual value is encoded. As previously described, the residual value may be equal to the residual value, or may be a positive or negative number relative to the predictive value. If the residual value is zero, then, in effect, there is no sign value, thus no sign value is encoded. For nonzero residual values, the sign value can be represented with a single bit, for example, using a 1 to represent a positive value and a 0 to represent a negative value, or vice versa. In determining the residual value from the predictive value, if the sign value is stored as a byte value, all but the least significant bits of the sign value are truncated when the encoded values are stored at block 1322.

At decision block 1320, it is determined if encoding has been completed for all elements in the image data. If not, process 1300 loops to block 1306 to identify the next portion of the image to be coded. However, once it is determined at decision block 1320 that encoding is complete, the encoded values are stored at block 1322.

In conjunction with a binary uncoded mode, the magnitude level tree suitably is truncated at a second layer. As previously described in connection with FIG. 13, magnitudes stored in the second layer of the tree construction are at least as high as the magnitude level of any elements stored on the first level. Generally, because magnitude levels will be at least similar, at most a few extra bits will be written for each element in encoding the M least significant bits of the residual value as described at block 1316 of FIG. 13. In many or most cases, the number of unnecessary residual value bits stored will be less than the number of bits saved by encoding only one magnitude level for every four elements.

Process of Tree Construction and Truncation

Figure 14:
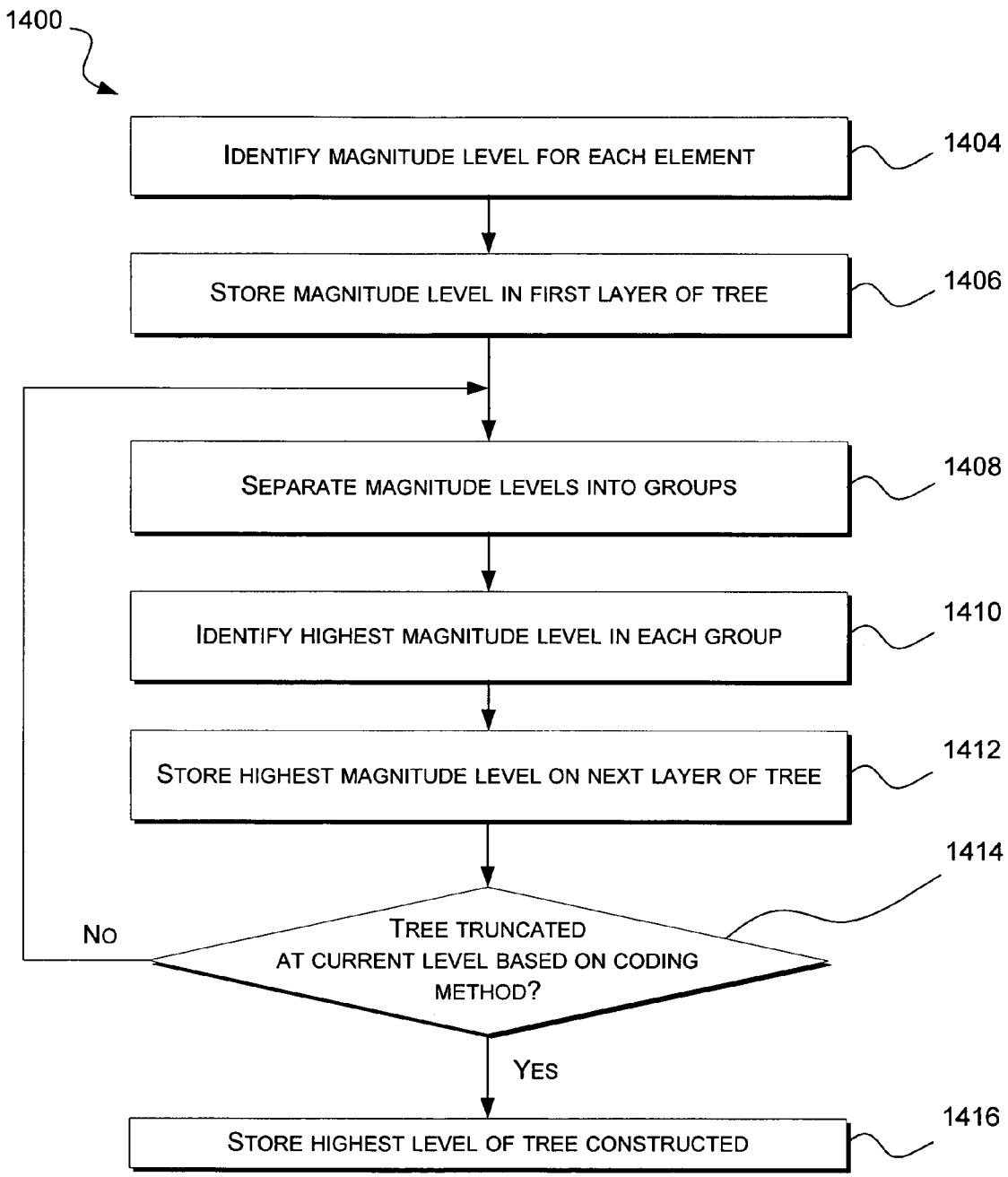
FIG. 14 is a flow diagram illustrating a process for creating a magnitude level tree.

FIG. 14 illustrates a process 1400 for coding magnitude levels in the form of a magnitude level tree as previously described in connection with FIGS. 8-11. At block 1404, a magnitude level for each element in the data to be compressed is determined as previously described. At block 1406, the magnitude levels identified are stored as the first layer of a magnitude level tree, as exemplified in FIG. 8 by elements 810 in first layer 801.

At block 1408, magnitude levels are separated into groups, such as the two-by-two group 812 on the first layer 801 of FIG. 8. At block 1410, a highest magnitude level in each of the groups is identified. At block 1412, the highest magnitude level identified for each group is stored on a next layer of the tree, as exemplified by second layer 802 of FIG. 8 and layer 1000 of FIG. 10.

At decision block 1414, it is determined if the magnitude level tree will be truncated at the current level based on the coding method selected. For example, using a binary uncoded method as previously described with regard to FIG. 12, the magnitude level tree may be truncated at the second layer to strike a balance between granularity of the magnitude levels used to code the residual values and the size of the magnitude level tree.

As described in connection with FIGS. 9-11, as more and more elements are associated with one magnitude level, there are more likely to be superfluous bits used in coding the residual values. On the other hand, in cases where elements are grouped into two-by-two groups, truncating the tree at each higher level reduces the number of magnitude levels to be coded by a factor of four. Using the binary uncoded method, truncating the tree at the second layer provides reasonable granularity of the magnitude level tree, but reduces the number of magnitude levels to be coded by a factor of four as compared to using all the magnitude levels. By contrast, using arithmetic coding, because the residual values will be further reduced in size, truncating the magnitude level tree at a third level provides sufficient magnitude level granularity while reducing the size of the magnitude level tree layer encoded by another factor of four. A choice of at what level to truncate the tree is based largely on the coding method selected, although it may include other factors as well.

If it is determined at decision block 1414 that the tree is to be truncated on the current level, at block 1416, the highest level of the tree constructed is stored to be used in coding and subsequently decoding the residual values. On the other hand, if the tree is not to be truncated at the current level, process 1400 loops to block 1408 to further separate the remaining magnitude levels into groups.

It should be noted that process 1400 represents only a single method of constructing a suitable magnitude level tree. Other methods can be used. To name just one alternative, in a case where it is known that the tree will be truncated at a third level, the magnitude levels associated with each of the elements could be separated into four-by-four groups, with the highest magnitude level of the four-by-four group selected directly.

Operation of a Magnitude Level Decoder

Figure 15:
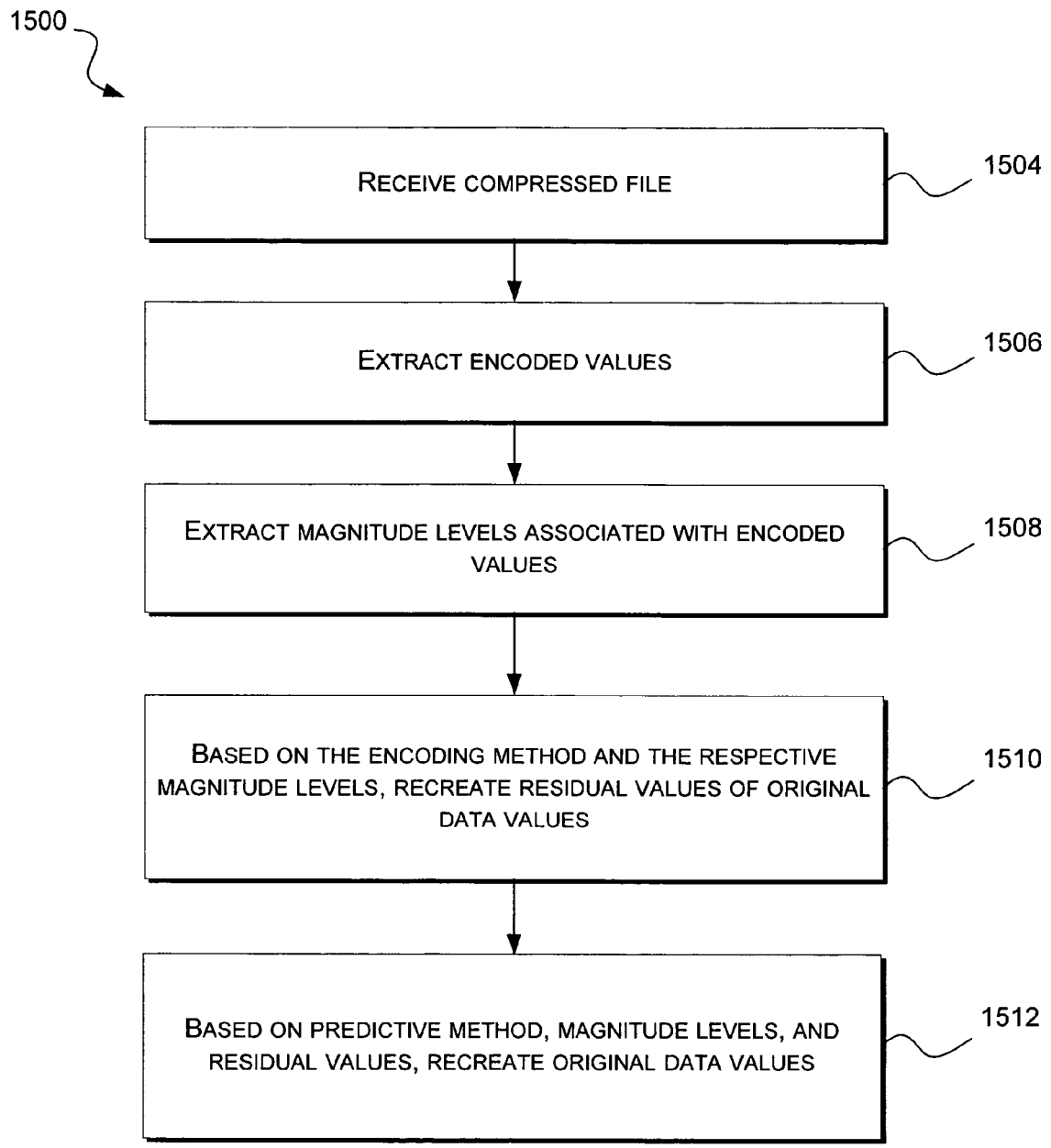
FIG. 15 is a flow diagram illustrating a process for decompressing an image file compressed according to the flow diagram of FIGS. 12 and 13.

FIG. 15 illustrates a process 1500 for an exemplary mode of magnitude level decoding usable to decompress data files compressed according to process 1200 of FIG. 12. As in the case of process 1200, it is assumed that the encoded values represent encoded residual values derived from a predictive method. However, it will be appreciated that modes of magnitude level compression and decompression are usable regardless of whether predictive methods are used.

At block 1504, a compressed file, such as a compressed image file, is received. At block 1506, encoded data values are extracted from the compressed files. At block 1508, magnitude levels associated with the encoded data values are extracted. As previously described, according to one mode of magnitude level compression described in connection with FIG. 12, magnitude levels are stored as a separate data construct in a separate portion of compressed file.

At block 1510, based on the encoding method and the magnitude levels associated with each of the encoded values, the residual values of the original data values are recreated. For example, if a binary uncoded method is used, the residual values are recreated by appending to the residual value a number of most significant zero bits. The number of bits added is equal to the word length less the associated magnitude level. The same magnitude level was used to remove the same number of most significant zero bits when the image was compressed, as previously explained in connection with FIG. 12. Alternatively, if arithmetic encoding or another encoding method was used in compressing the data files, the encoding method is reversed according to appropriate known methods.

Figure 16:
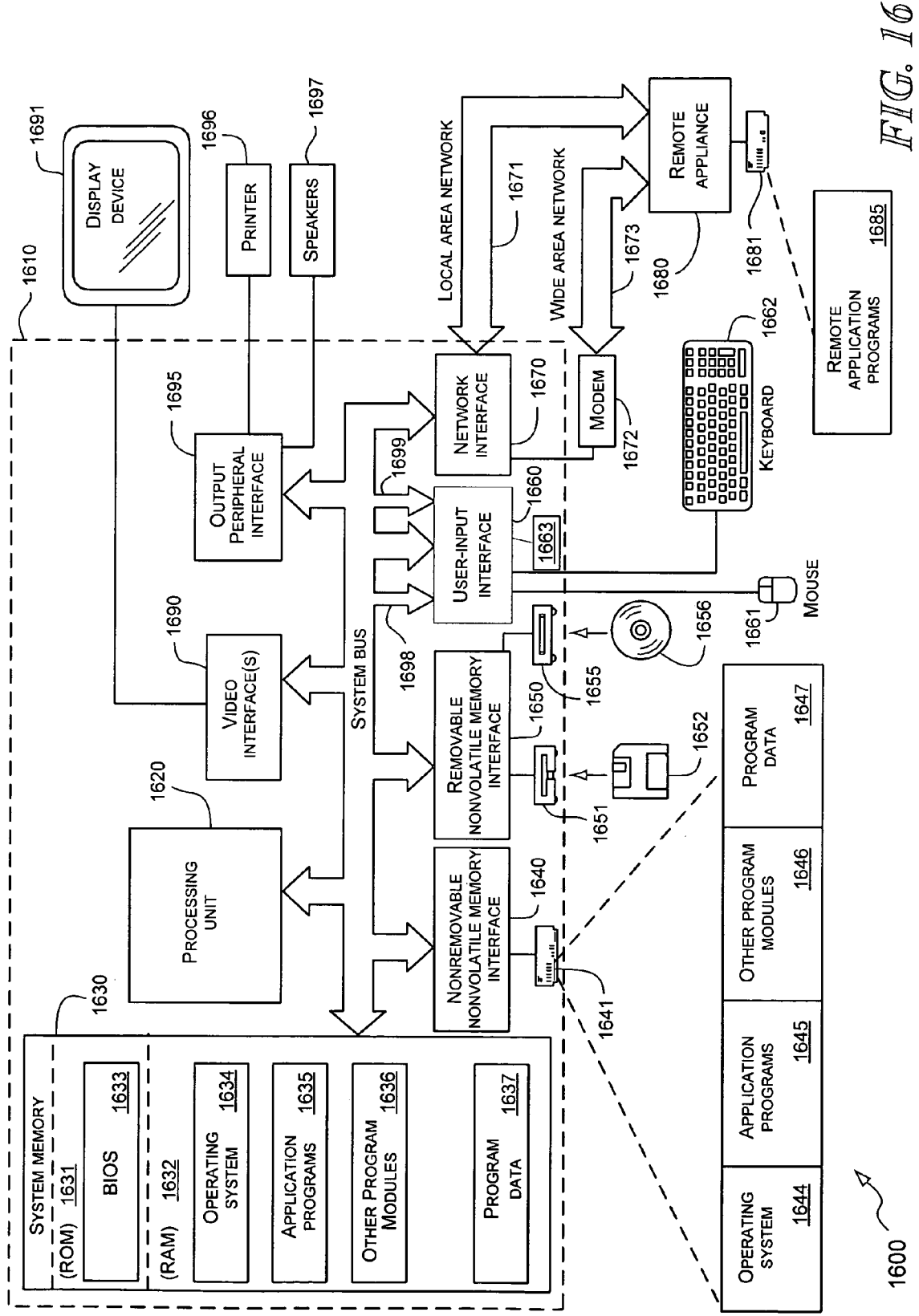
FIG. 16 is a block diagram of a computing-system environment suitable for use with encoding or decoding data according to modes of the present invention.

Once the residual values have been recreated at block 1510, at block 1512, the original values are recreated. Because the method of determining predictive and residual values is encoded with the compressed image file, the original values can be recreated from the residual values. If a key or reference value will be used to decode the compressed data, the value is encoded within the compressed data for use by the decoder Computing System for Implementing Exemplary Embodiments FIG. 16 illustrates an exemplary computing system 1600 for implementing modes of lossless data compression and decompression. The computing system 1600 is only one example of a suitable operating environment and is not intended to suggest any limitation as to the scope of use or functionality of exemplary embodiments of the process previously described or other embodiments. Neither should the computing system 1600 be interpreted as having any dependency or requirement relating to any one or combination of components illustrated in the exemplary computing system 1600.

The compression and decompression processes may be described in the general context of computer-executable instructions, such as program modules, being executed on the computing system 1600. Generally, program modules include routines, programs, objects, components, data structures, etc., that perform particular tasks or implement particular abstract data types. Moreover, those skilled in the art will appreciate that the compression process may be practiced with a variety of computer-system configurations, including hand-held devices, multiprocessor systems, microprocessor-based or programmable-consumer electronics, minicomputers, mainframe computers, and the like. The compression and decompression processes may also be practiced in distributed-computing environments where tasks are performed by remote-processing devices that are linked through a communications network. In a distributed-computing environment, program modules may be located in both local and remote computer-storage media including memory-storage devices.

With reference to FIG. 16, an exemplary computing system 1600 for implementing the compression and/or decompression process includes a computer 1610 including a processing unit 1620, a system memory 1630, and a system bus 1621 that couples various system components including the system memory 1630 to the processing unit 1620.

The computer 1610 typically includes a variety of computer-readable media. By way of example, and not limitation, computer-readable media may comprise computer-storage media and communication media. Examples of computer-storage media include, but are not limited to, Random Access Memory (RAM); Read Only Memory (ROM); Electronically Erasable Programmable Read Only Memory (EEPROM); flash memory or other memory technology; CD ROM, digital versatile discs (DVD) or other optical or holographic disc storage; magnetic cassettes, magnetic tape, magnetic disk storage or other magnetic storage devices; or any other medium that can be used to store desired information and be accessed by computer 1610. The system memory 1630 includes computer-storage media in the form of volatile and/or nonvolatile memory such as ROM 1631 and RAM 1632. A Basic Input/Output System 1633 (BIOS), containing the basic routines that help to transfer information between elements within computer 1610 (such as during start-up) is typically stored in ROM 1631. RAM 1632 typically contains data and/or program modules that are immediately accessible to and/or presently being operated on by processing unit 1620. By way of example, and not limitation, FIG. 16 illustrates the operating system 1634, application programs 1635, other program modules 1636, and program data 1637.

The computer 1610 may also include other removable/nonremovable, volatile/nonvolatile computer-storage media. By way of example only, FIG. 16 illustrates a hard disk drive 1641 that reads from or writes to nonremovable, nonvolatile magnetic media, a magnetic disk drive 1651 that reads from or writes to a removable, nonvolatile magnetic disk 1652, and an optical-disc drive 1655 that reads from or writes to a removable, nonvolatile optical disc 1656 such as a CD-ROM or other optical media. Other removable/nonremovable, volatile/nonvolatile computer-storage media that can be used in the exemplary operating environment include, but are not limited to, magnetic tape cassettes, flash memory units, digital versatile discs, digital video tape, solid state RAM, solid state ROM, and the like. The hard disk drive 1641 is typically connected to the system bus 1621 through a nonremovable memory interface such as interface 1640. The magnetic disk drive 1651 and optical disc drive 1655 are typically connected to the system bus 1621 by a removable memory interface, such as the interface 1650.

The drives and their associated computer-storage media discussed above and illustrated in FIG. 16 provide storage of computer-readable instructions, data structures, program modules and other data for the computer 1610. For example, hard disk drive 1641 is illustrated as storing the operating system 1644, application programs 1645, other program modules 1646, and program data 1647. Note that these components can either be the same as or different from the operating system 1634, application programs 1635, other program modules 1636, and program data 1637. Typically, the operating system, application programs, and the like that are stored in RAM are portions of the corresponding systems, programs, or data read from the hard disk drive 1641, the portions varying in size and scope depending on the functions desired. The operating system 1644, application programs 1645, other program modules 1646, and program data 1647 are given different numbers here to illustrate that, at a minimum, they can be different copies. A user may enter commands and information into the computer 1610 through input devices such as a keyboard 1662; pointing device 1661, commonly referred to as a mouse, trackball or touch pad; a wireless-input-reception component 1663; or a wireless source such as a remote control. Other input devices (not shown) may include a microphone, joystick, game pad, satellite dish, scanner, or the like. These and other input devices are often connected to the processing unit 1620 through a user-input interface 1660 that is coupled to the system bus 1621 but may be connected by other interface and bus structures, such as a parallel port, game port, IEEE 1394 port, or a universal serial bus (USB) 1698, or infrared (IR) bus 1699. As previously mentioned, input/output functions can be facilitated in a distributed manner via a communications network.

A display device 1691 is also connected to the system bus 1621 via an interface, such as a video interface 1690. The display device 1691 can be any device to display the output of the computer 1610 not limited to a monitor, an LCD screen, a TFT screen, a flat-panel display, a conventional television, or screen projector. In addition to the display device 1691, computers may also include other peripheral output devices such as speakers 1697 and printer 1696, which may be connected through an output peripheral interface 1695.

The computer 1610 will operate in a networked environment using logical connections to one or more remote computers, such as a remote computer 1680. The remote computer 1680 may be a personal computer, and typically includes many or all of the elements described above relative to the computer 1610, although only a memory storage device 1681 has been illustrated in FIG. 16. The logical connections depicted in FIG. 16 include a local-area network (LAN) 1671 and a wide-area network (WAN) 1673 but may also include other networks, such as connections to a metropolitan-area network (MAN), intranet, or the Internet.

When used in a LAN networking environment, the computer 1610 is connected to the LAN 1671 through a network interface or adapter 1670. When used in a WAN networking environment, the computer 1610 typically includes a modem 1672 or other means for establishing communications over the WAN 1673, such as the Internet. The modem 1672, which may be internal or external, may be connected to the system bus 1621 via the network interface 1670, or other appropriate mechanism. The modem 1672 could be a cable modem, DSL modem, or other broadband device. In a networked environment, program modules depicted relative to the computer 1610, or portions thereof, may be stored in the remote memory storage device. By way of example, and not limitation, FIG. 16 illustrates remote application programs 1685 as residing on memory device 1681. It will be appreciated that the network connections shown are exemplary, and other means of establishing a communications link between the computers may be used.

Although many other internal components of the computer 1610 are not shown, those of ordinary skill in the art will appreciate that such components and the interconnections are well-known. For example, including various expansion cards such as television-tuner cards and network-interface cards within a computer 1610 is conventional. Accordingly, additional details concerning the internal construction of the computer 1610 need not be disclosed in describing exemplary embodiments of the compression process.

When the computer 1610 is turned on or reset, the BIOS 1633, which is stored in ROM 1631, instructs the processing unit 1620 to load the operating system, or necessary portion thereof, from the hard disk drive 1641 into the RAM 1632. Once the copied portion of the operating system, designated as operating system 1644, is loaded into RAM 1632, the processing unit 1620 executes the operating system code and causes the visual elements associated with the user interface of the operating system 1634 to be displayed on the display device 1691. Typically, when an application program 1645 is opened by a user, the program code and relevant data are read from the hard disk drive 1641 and the necessary portions are copied into RAM 1632, the copied portion represented herein by reference numeral 1635.

CONCLUSION

Although exemplary embodiments have been described in language specific to structural features and/or methodological acts, it is to be understood that the appended claims are not necessarily limited to the specific features or acts previously described. Rather, the specific features and acts are disclosed as exemplary embodiments.

The invention claimed is:

1. A method comprising a processor to perform acts of:
    deriving a magnitude level for each of a plurality of data values, the magnitude level representing a number of digits used to represent the data value;
    storing a magnitude level in a first layer of a tree;
    separating the magnitude levels into a plurality of groups;
    identifying a highest magnitude level among the magnitude levels within each group as a group magnitude level;
    storing the magnitude level in a second layer of the tree;
    determining if the magnitude level on the tree will be truncated at a current level:
        truncating the tree at the current level;
        storing the current level in the highest magnitude level of the tree;
    determining if the magnitude level on the tree will not be truncated at a current level:
        further separating remaining magnitude levels into the plurality of groups;
    applying an encoding method to derive encoded values from the data values, each of the encoded values being derived from a number of digits equal to the group magnitude level;
    compressing the data values to reduce data storage and bandwidth to store and transmit data values; and
    decompressing compressed data values to display data values.

2. A method of claim 1, further comprising generating a compressed set of data values including:
    the encoded values; and
    at least one of:
    at least a portion of the group magnitude levels; and
    a method designation indicating the encoding method used in deriving the encoded values.

3. A method of claim 1, wherein each of the data values includes a residual value derived from a respective raw value, the method further comprising for each raw data value:
    deriving a predictive value based on at least one reference raw value; and
    deriving the residual value front a difference between the raw value and the predictive value.

4. A method of claim 3, further comprising for each data value:
    deriving a sign value representing that the residual value is one of greater and less than the predictive value; and
    associating the sign value with the encoded value derived from the residual value.

5. A method of claim 3, wherein the predictive value includes:
    an individually derived predictive value based on at least one reference raw value spatially related to the raw value in the set of data values;
    a common predictive value based on a plurality of reference raw values and associated with each of the plurality of raw values.

6. A method of claim 1, wherein the data values represent an image and further comprising:
    collecting the magnitude levels in a first layer;
    separating the magnitude levels in the first layer into a plurality of first groups, each of the first groups including a plurality of magnitude levels and corresponding with a portion of the image;
    identifying a plurality of first group magnitude levels representing a highest magnitude within each of the first group;
    collecting the first group magnitude levels in a second layer;
    wherein each of the data values includes a residual value derived from a respective raw value;
    deriving a predictive value based on at least one reference raw value, and
    deriving the residual value from a difference between the raw value and the predictive value.

7. A method of claim 6, further comprising applying a binary uncoded method as the encoding method, collecting from the residual value for each data value associated with the magnitude levels in each of the first groups a number of least significant bits equal to the first group magnitude level.

8. A method of claim 6, further comprising:
separating the first group magnitude levels in the second layer into a plurality of second groups, each of the second groups including a plurality of first group magnitude levels; and
identifying a plurality of second group magnitude levels representing a highest magnitude within each of the second groups.

9. A method of claim 6, further comprising applying an arithmetic coding method as the encoding method, deriving from the residual value for each data value associated with the magnitude levels in each of the first groups an arithmetically coded value derived from a number of least significant bits equal to the second group magnitude levels.

10. A computer-readable medium having computer-useable instructions embodied thereon for executing the method of claim 1.

11. A method for compressing a set of data values executable on a processor to perform acts, the method comprising:
deriving for each data value:
a predictive value based on at least one reference value; and
a residual value representing a difference between the data value and the predictive value; and
separating the residual values into a plurality of groups;
deriving a minimizing value from the residual values within each group relative to which only a portion of the residual values are used to differentiate among the residual values;
applying an encoding method to derive encoded values from the residual values, the encoded values being derived based on the minimizing value; and
generating a compressed set of data values including:
the encoded values; and
the minimizing value for each group;
receiving the residual values and a starter value included with the compressed set of data values; and
storing the compressed set of data values to reduce data storage and bandwidth to store and transmit data values.

12. A method of claim 11, further comprising including in the compressed set of data values at least one of:
a method designation indicating the encoding method used in deriving the encoded values; and
a plurality of sign values, each of the sign values representing that the residual value is one of greater and less than the predictive value.

13. A method of claim 11, wherein the minimizing value includes a group residual value from which the residual values in the group are representable using a fewer number of digits than a number of digits used to represent the residual values in the group.

14. A method of claim 11, wherein the minimizing value includes a highest magnitude level representing a number of digits used to represent a highest residual value in the group.

15. A method of claim 14, further comprising applying a binary uncoded method as the encoding method, extracting a number of least significant bits of each of the residual values equal to the highest magnitude level of the group as the encoded values.

16. A method of claim 14, further comprising applying an arithmetic coding method as the encoding method, deriving from the residual value for each data value associated with the magnitude levels in each of the first groups an arithmetically coded value derived from a number of least significant bits equal to the second group magnitude levels.

17. A computer-readable medium having computer-useable instructions embodied thereon for executing the method of claim 11.

18. A method of extracting original data values represented in a data file compressed according to a coding method, executable on a processor to perform acts, the method comprising:
receiving the compressed data file, the compressed data value including:
a plurality of encoded values; and
a plurality of associated magnitude levels, each the associated magnitude levels representing a number of bits used in deriving the encoded values from the original data values for a portion of the encoded values;
extracting the plurality of associated magnitude levels with encoded values;
using the associated magnitude levels and encoded values from the original data, deriving residual values for each of the encoded values;
receiving the residual values and a starter value included with the compressed data file;
for each of the encoded values, using the associated magnitude level to reverse the coding method to recreate the original values; and
displaying the original values on a display device.

19. A method of claim 18, wherein the encoded values include encoded residual values generated according to a predictive method.

20. A method of claim 18, further comprising extracting the plurality of associated magnitude levels from a first portion of the data file including a set of magnitude levels corresponding with a second portion of the data file including the plurality of encoded values.

* * * * *